Feb. 16, 1932.    O. V. MARTIN    1,845,675
APPARATUS FOR LIFTING LIQUID FROM WELLS
Filed Aug. 14, 1930    2 Sheets-Sheet 1
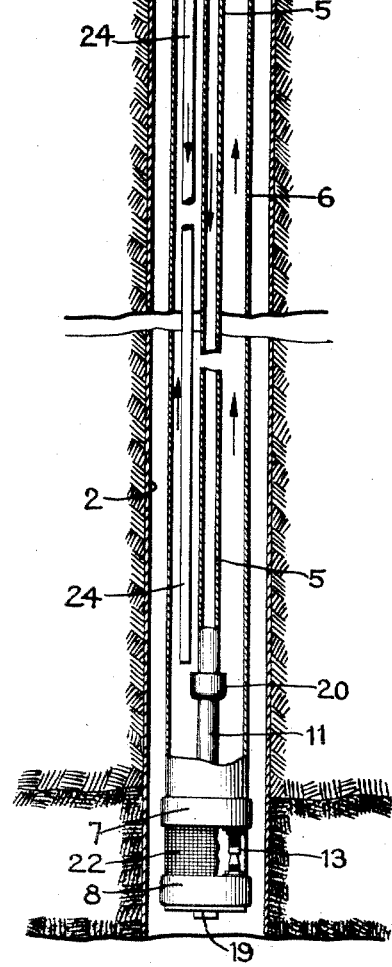
FIG.1.
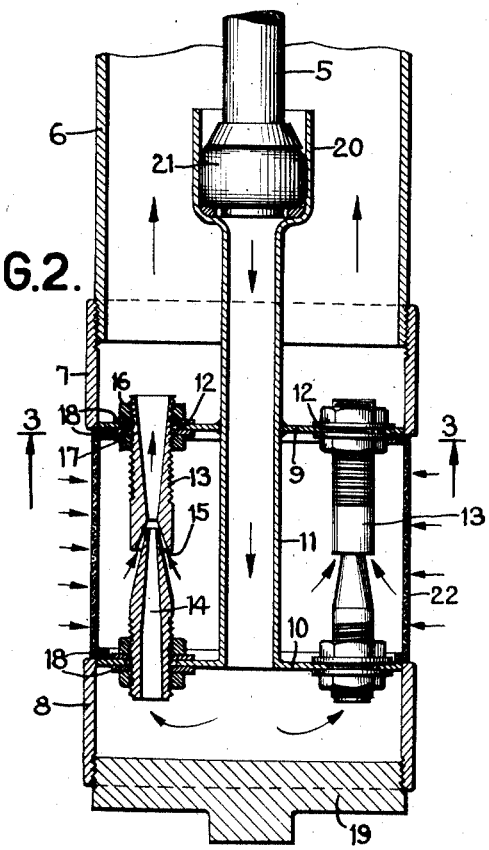
FIG.2.
FIG.3.
INVENTOR
Otto V. Martin
BY ATTORNEY R. J. Dearborn

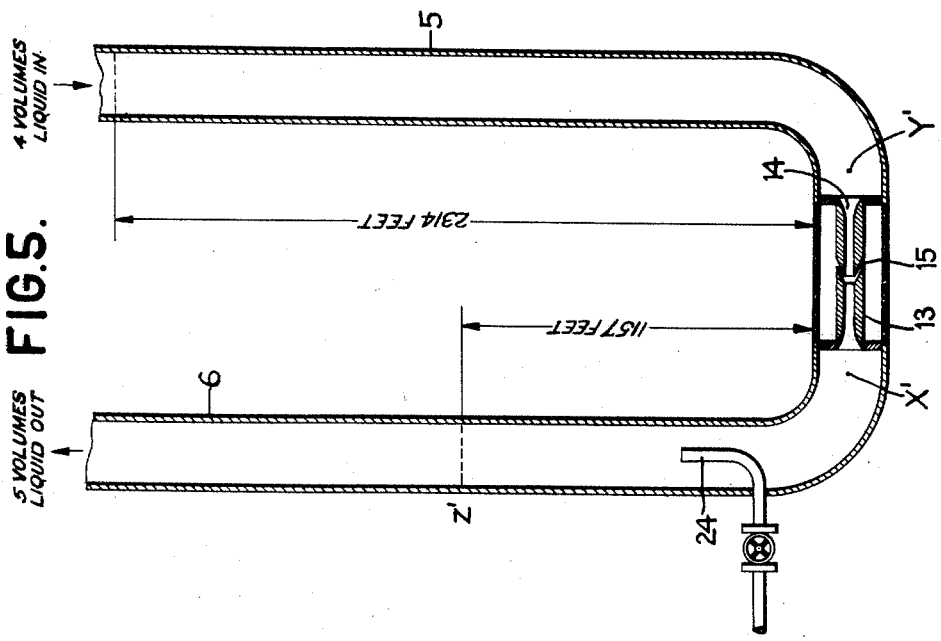
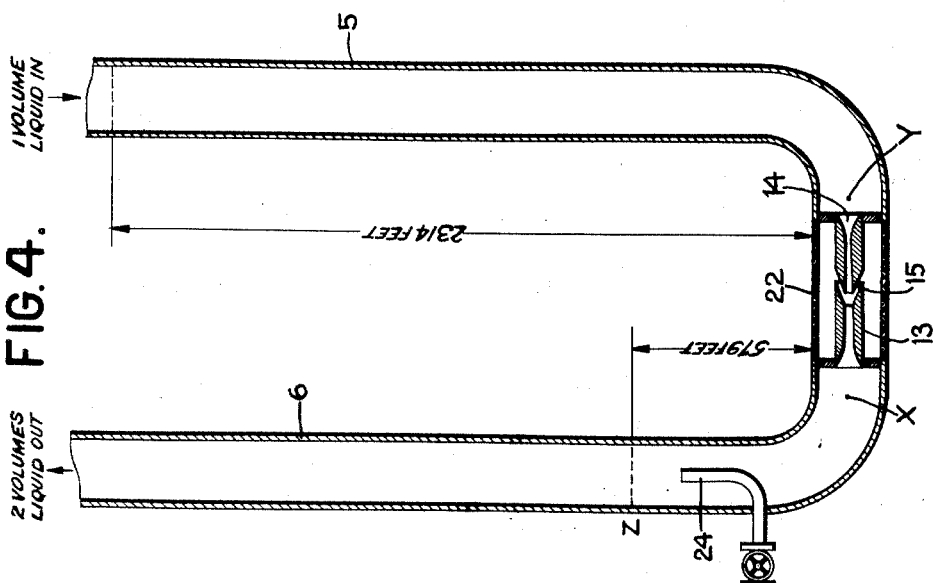

Patented Feb. 16, 1932

1,845,675

UNITED STATES PATENT OFFICE

OTTO V. MARTIN, OF SAND SPRINGS, OKLAHOMA, ASSIGNOR TO THE TEXAS COMPANY, OF NEW YORK, N. Y., A CORPORATION OF DELAWARE

APPARATUS FOR LIFTING LIQUID FROM WELLS

Application filed August 14, 1930. Serial No. 475,269.

The invention broadly contemplates an apparatus for continuously lifting liquid, such as oil, water, brine and the like, from wells wherein the depth of liquid is normally insufficient to provide submergence for a gas lift, which is adapted to create and maintain an artificial submergence by injector means submerged in the liquid in the bottom of the well whereby the liquid may be lifted through the remaining distance to the surface of the well with a gas lift to overflow therefrom to suitable collecting means.

The invention also contemplates apparatus particularly well adapted to lifting liquid from wells in which the liquid accumulates very slowly, or in which there is insufficient natural pressure to raise the liquid to an appreciable height within the casing.

As is generally understood, when employing air or gas as a means of lifting liquid from wells it is necessary that the head of liquid in the lower portion of the well casing or around the air lift discharge pipe, or in other words, the submergence, must be sufficient to balance or support the column of fluid, rising through the pipe to the top of the well, consisting of a mixture of the gas and the liquid to be lifted, otherwise the fluid would not be discharged from the pipe. It is usually desirable, if not entirely necessary from an economical standpoint, that the liquid standing in the bottom of the well around and within the casing have a depth sufficient to provide a submergence for the gas lift of at least approximately 25 per cent of the distance through which the liquid must be raised to reach the surface of the well and under which conditions gas must be introduced to the bottom of the discharge pipe at a rate sufficient to form a column of fluid comprising approximately 3 volumes of gas for every volume of liquid. Actually the ratio of gas to liquid may be somewhat greater than this in order to overcome friction, slippage and other losses.

With a submergence equivalent to 25 per cent or more of the static lift or the distance to be lifted, liquid can usually be readily lifted to the surface of the well, but with submergence decreasing below this point the mechanical efficiency of the air lift falls off very rapidly from about 25 to 1 per cent or less and it therefore becomes increasingly difficult and eventually impossible to lift liquid by this means.

In producing areas which have passed beyond the flush period of their production, it is usually impossible to pump the wells continuously due to the slowness with which the oil or other liquid seeps into the casing from the surrounding sands. It is therefore customary to allow such a well to stand idle during the major portion of the time and pump intermittently as the liquid accumulates within the casing to a sufficient height to permit lifting it with the conventional apparatus or means hitherto available.

Moreover, the economical use of the air lift many be precluded entirely in some wells on account of the excessively large pressures required in order to force gas or air to the bottom of the casing or discharge pipe, particularly when displacing liquid from the well discharge pipe prior to commencing lifting operations, while in many cases the successful use of rod pumps is also prevented due to the crookedness of the holes.

By means of my invention I am able to overcome these difficulties, so that I am able to lift liquid from wells in which the employment of air or gas lifts has hitherto been impossible due to lack of sufficient submergence, or for other reasons, or in which pumping with a rod pump is attended with exceedingly high operating costs and may even be impossible due to various mechanical limitations. Moreover, I am able to lift liquid substantially continuously over prolonged or indefinite periods of time, thereby greatly increasing the production beyond that which has been possible heretofore.

My invention therefore comprises creating artificial submergence for gas lift pumping of liquid from wells normally having an inappreciable head or depth of liquid therein, by delivering an actuating stream of fluid to injector means submerged in the liquid in the bottom of the well to flow through the injector whereby liquid is entrained from the well and the admixture of actuating or impelling and entrained liquid is discharged into the gas lift discharge conduit or pipe under a pressure sufficient to support a rising column of fluid therein, consisting of a mixture of gas and liquid extending to the top of the conduit from which it overflows to suitable collecting means.

In order to more clearly understand the invention, reference will now be had to the figures of the accompanying drawings illustrating a preferred embodiment of apparatus adapted to carrying out the invention and its application in the practice of the invention in which:

Figure 1 is a diagrammatic sectional view of a well and apparatus adapted to carrying out the invention.

Figure 2 is a sectional elevation of the injector apparatus adapted to be submerged in liquid in the bottom of the well.

Figure 3 is a cross sectional view taken along the line 3—3 of Figure 2 with the injector jets removed.

Figures 4 and 5 diagrammatically illustrate the method of practicing my invention when creating artificial submergence within the well.

Referring to Figures 1, 2 and 3 a tank 1 is located near the top or surface of a well having a casing 2, and has a pipe 3, having a valve 4, which communicates with a pipe 5 extending to the bottom of the well, within an outer and somewhat larger pipe 6 similarly extending to the bottom of the well.

The lower and threaded end of pipe 6 is secured into the upper portion of a spool-like member comprising two relatively short pipe sections 7 and 8, preferably formed from conventional pipe collars having their inner adjacent ends closed by plates 9 and 10 respectively, secured together by a conduit 11 whose lower end is welded into a hole provided in the center of the plate 10 and whose upper portion is projected through a similar hole in the plate 9 wherein it is also secured by welding.

As shown in Figure 3, plates 9 and 10 have a plurality of holes 12, adapted to receive the ends of injector jets 13, which are of more or less conventional design, having a restricted passage or throat 14, and suction ports 15. The ends of the jets are threaded to accommodate lock nuts 16 and 17, the threads extending over a substantial portion of the nozzles so that the nuts 17 outside the plates 9 and 10 may be moved towards each other sufficiently to permit readily inserting the jet in the corresponding holes 12. Upon insertion therein the nuts 17 are screwed towards the outer surfaces of the plates 9 and 10, so as to hold the jet rigidly in its proper position, after which the nuts 16 may be screwed onto the ends of the jet projecting through the plates 9 and 10 to lock the jets securely and tightly in position. Suitable gaskets 18 are preferably inserted between the surfaces of the plates and the nuts 16 and 17 so as to make the joints leakproof.

The lower end of the pipe section or collar 8 is closed with a conventional pipe cap 19 which permits access to the interior of the collar 8 when removing or inserting the jets 13. Access to the interior of the upper collar 7 being had by disconnecting the spool from the end of the pipe 6.

In this way the nozzles or jets may be readily removed and others of different size substituted, thereby affording flexibility in the application of the injector so as to meet varying conditions of flow within the well or in different wells.

The upper end of the conduit 11 is preferably expanded to form a cup 20 adapted to receive the lower end of the pipe 5. The annular space between the inside of the cup 20 and the exterior of pipe 5 is preferably sealed off by means of a conventional packer 21.

Thus liquid from the pipe 5 flows through the conduit 11 into the chamber formed by the lower pipe collar 8, from which it then flows through the injector jets 13 to be discharged therefrom, along with the liquid entrained through the injector jet suction ports 15, into the discharge chamber formed by the collar 7 and from which it may rise into the pipe 6.

A screen 22 may be formed by wrapping woven wire of suitable mesh around the circumferential edges of the collars 7 and 8 to prevent foreign material from gaining access to the suction ports of the jets and otherwise tending to plug them.

A compressor 23 at the surface of the well is adapted to deliver compressed gas or air through a pipe 24 extending down through the annular space between the interior of the pipe 6 and the exterior of the pipe 5 from which it may be discharged a short distance above the injector to mix with the liquid discharged therefrom and form a column of fluid, consisting of a mixture of gas and liquid, which is light enough to rise through the pipe 6 to the surface of the well.

In practicing my invention, liquid is conducted from the tank 1 into the pipe 5, preferably at such a rate as to maintain the pipe constantly full of liquid while flowing through the injector 9 and entraining the desired quantity of liquid from the well through the suction ports 15. The mixture of actuating liquid and liquid entrained from the well is then discharged into the discharge pipe 6 under a pressure sufficient to support a column of liquid which may be equivalent to from 25 to 50 percent of the distance from the injector to the surface of the well, and thereby providing an artificial submergence for air or gas lifting of from 25 to 50 percent.

Gas is therefore introduced under pressure through the pipe 24 to the bottom of the pipe 6 to mix therein with the liquid leaving the injector, so as to form a column of fluid consisting of one volume of liquid and roughly from 1 to 3 volumes of gas, depending upon whether the artificial submergence ranges from 50 to 25 percent respectively of the total lift.

The column of fluid rising through the pipe 6 overflows at the surface of the well through a pipe 25 into the tank 1. The gas which has been introduced to the well separates from the liquid in the tank 1 and escapes, while the excess liquid collecting in the tank may be drawn off to storage through a pipe 26, having a valve 27.

While the introduction of actuating fluid through the inner pipe 5 and discharge of the mixture of air and gas through the pipe 6 has been described, it is contemplated that the position of the jets may be reversed and the actuating liquid introduced instead through the pipe 6 while the mixture of gas and liquid is discharged through the inner pipe 5. This latter method of flow may be desirable since there may be less friction to overcome by the fluid discharging through the pipe 5 than through the annular space between the pipes 5 and 6.

The operating characteristics of the injector jets may vary over a considerable range depending upon their design. For example, jets are available in the industry which may entrain or pick up one volume of liquid for each volume of fluid passing through their throats, and under which conditions the pressure drop through the jet may be roughly four times the pressure existing in the discharge port of the jet. On the other hand, a jet of slightly different throat design may entrain only one volume of liquid for every 4 volumes of actuating fluid passing through the throat with a pressure drop through the jet approximately equal to the pressure existing in the discharge port of the jet.

Referring to Figure 4, the injector jet 13 submerged in a body of water in the bottom of a well of approximately 2314 feet depth is adapted to entrain or pick up one gallon of water for every gallon passing through the throat 14 from the pipe 5. Thus during operation of the apparatus by maintaining the pipe 5 constantly full of water a pressure of approximately 1000 pounds per square inch gauge will exist constantly at the point Y due to the weight of a column of water 2314 feet high, assuming one atmosphere equivalent to a head of water approximately 34 feet high. Under this pressure the water flows through the throat 14 under a velocity sufficient to create a vacuum in the suction ports 15 whereby an equal volume of water is drawn in from the well. The combined streams of actuating and entrained water are then discharged from the injector into the bottom of the pipe 6 at the point X under a pressure approximately one-fourth of the static pressure at Y; i. e. about 250 pounds per square inch gauge, disregarding frictional losses and the like, which is sufficient to support a column of liquid rising in the pipe 6 to a point Z corresponding to about 579 feet above the injector.

An artificial submergence or head of water of 579 feet, or 25 percent of the distance to the surface of the well, is thus created, so that by introducing gas through the pipe 24 to the bottom of pipe 6 in order to mix with the water and form a column of fluid 2314 feet high consisting of approximately 3 volumes of gas to 1 volume of water, the mixture of gas and water will rise through the pipe 6 and overflow therefrom at the surface of the well, provided sufficient gas is introduced to maintain the column of mixed gas and liquid always slightly lighter than a column of water extending from X to Z within the pipe 6, or equivalent to a height of about 579 feet.

In Figure 5 the injector 13 is adapted to entrain 1 gallon of water from the well for every 4 gallons passed through it from the pipe 5. Under these conditions the pressure at $Y_1$ will still be 1000 pounds per square inch gauge, provided the pipe 5 is maintained full of liquid, but since a relatively small amount of liquid is being entrained from the well the discharge pressure at $X_1$ will be about one-half of $Y_1$, or about 500 pounds per square inch gauge, which is sufficient to support a column of water of about 1157 feet. Thus in this case the artificial submergence corresponding to the distance between $X_1$ and $Z_1$, amounts to approximately 50 per cent of the total distance through which the water must be lifted from the bottom of the well.

With a submergence of 50 per cent gas may be introduced through the pipe 24 at a sufficient rate to form a column of fluid admixture 2314 feet high, consisting of slightly over 1 part of gas to 1 part of water, which is lighter than a column $X_1$—$Z_1$ of water alone and will therefore rise through the pipe 6 and overflow therefrom at the surface of the well.

The mechanical efficiency of the gas lift, as is well known, is proportional to the depth of submergence available. That is, the efficiency may be about 60 per cent for a submergence of 50 per cent and drop off to around 25 per cent for a submergence equal to 25 per cent of the static lift, while with still smaller depths of submergence the efficiency may drop off even much more rapidly. Consequently, it is desirable to create and maintain as high a degree of artificial submergence as is possible within the limits of the apparatus.

Although the circulation of as much as 4 gallons of liquid through the injector for every volume entrained has been described, it is contemplated that larger circulating ratios, two or three times this figure, may be employed if desired. However, the size of the casing in certain wells may be so limited that relatively small injectors and conduits only may be introduced, which would militate against the circulation through the injector of relatively large volumes of impelling liquid in proportion to the volume of liquid being lifted from the well, which latter condition favors the production of maximum depth of artificial submergence as already described in connection with the discussion of Figure 5.

An important feature of my invention, therefore, comprises maintaining, within certain fairly wide limits, any desired head of submergent liquid without the necessity of employing mechanical pumping means at the surface of the well, although such means may be employed in connection with the injector, if desired, as for example, when commencing lifting operations in order to facilitate reaching equilibrium conditions of flow. In carrying out the method of my invention, it is only necessary to select jets of suitable capacity and to maintain the pipe 5, supplying actuating fluid to the submerged injector, sufficiently full of liquid so as to supply liquid to the injector under sufficient static pressure to effect the necessary rate of entrainment of liquid to be pumped.

By means of my invention I may also exert a vacuum within the well casing or in the sands adjacent thereto by sealing off the space between the casing 2 and the pipe 6 at any suitable point with conventional packer means 28. The creation of reduced pressures in this way may greatly facilitate the rate of accumulation of liquid within the bottom of the casing from the surrounding sand.

It will be seen that by means of my invention I am able to lift liquid from relatively deep wells wherein the normal depth of liquid or its rate of accumulation therein is insufficient to provide submergence for air or gas lifting in the conventional manner. Moreover by employing the injector means of my invention as a booster to thereby effect an increase in the working efficiency over that ordinarily realized in air lift pumping of liquid, I am able to recover liquids, particularly oil from oil wells, much more economically than has hitherto been possible.

Obviously many modifications and variations of the invention, as hereinbefore set forth, may be made without departing from the spirit and scope thereof, and therefore only such limitations should be imposed as are indicated in the appended claims.

I claim:

1. In liquid lifting apparatus injector pumping means comprising an outlet chamber and an inlet chamber provided with a plurality of ports in their adjacent sides, a plurality of injectors secured in and forming liquid communicating means between corresponding ports in the adjacent sides of the chambers, and means for supplying liquid to the receiving chamber to actuate the injectors.

2. In liquid lifting apparatus injector pumping means comprising an outlet chamber and an inlet chamber provided with a plurality of ports in their adjacent sides, a screen extending between the adjacent peripheral edges of the chambers, a plurality of injectors secured in and forming liquid communicating means between corresponding ports in the adjacent sides of the chambers, and means for supplying liquid to the inlet chamber to actuate the injectors.

3. In liquid lifting apparatus, injector pumping means comprising an outlet chamber and an inlet chamber provided with a plurality of ports in their adjacent sides, a screen extending between the adjacent peripheral edges of the chambers, a delivery pipe extending through the outlet chamber while secured to the bottom thereof, and connecting with the inlet chamber to provide means through which actuating liquid is delivered to said inlet chamber, and a plurality of injectors secured in and forming liquid communicating means between corresponding ports in the adjacent sides of the chambers.

4. In liquid lifting apparatus, injector pumping means comprising an outlet chamber and an inlet chamber provided with a plurality of ports in their adjacent sides, a plurality of jet nozzles secured in the ports of the inlet chamber, and a plurality of corresponding Venturi throats secured in the ports of the adjacent side of the outlet chamber, the nozzles and throats forming liquid communicating means between the ports in the adjacent sides of the chambers whereby liquid to be lifted is injected through the throats and discharged along with the jet-actuating liquid.

5. In liquid lifting apparatus, injector pumping means comprising an outlet chamber and an inlet chamber provided with a plurality of ports in their adjacent sides, a plurality of jet nozzles secured in the ports of the inlet chamber, a plurality of corresponding Venturi throats secured in the ports of the adjacent side of the outlet chamber, the nozzles and throats forming liquid communicating means between the ports in the adjacent sides of the chambers whereby liquid to be lifted is injected and discharged along with the jet-actuating liquid, and means to adjust the distance between the jets and corresponding Venturi throats.

6. Apparatus for lifting liquid from wells comprising an outlet chamber and an inlet chamber supported one above the other, with a plurality of ports in their adjacent sides, a discharge pipe communicating with the outlet chamber, an actuating liquid delivery pipe communicating with the inlet chamber, a plurality of injectors secured in and forming liquid communicating means between corresponding ports in the adjacent sides of the chambers, means for maintaining a constant head of liquid in the delivery pipe, and means for maintaining an aerated column of liquid in the discharge pipe whereby, due to the difference in pressure head, liquid flows from the delivery pipe through the injector tubes entraining liquid from the well and rising therewith through the discharge pipe.

7. Apparatus for lifting liquid from wells comprising an outlet chamber and an inlet chamber supported one above the other, with a plurality of ports in their adjacent sides, a discharge pipe communicating with the outlet chamber, an actuating liquid delivery pipe communicating with the inlet chamber, a plurality of jet nozzles adjustably secured in the ports of the inlet chamber, a plurality of corresponding Venturi throats in operative communication therewith, adjustably secured in the ports of the outlet chamber and forming liquid communicating means therebetween, means for maintaining a constant head of liquid in the delivery pipe, and means for maintaining an aerated column of liquid in the discharge pipe whereby, due to the difference in pressure head, liquid flows from the delivery pipe through the injector tubes entraining liquid from the well and rising therewith through the discharge pipe.

In witness whereof I have hereunto set my hand this 22 day of July, 1930.

OTTO V. MARTIN.

CERTIFICATE OF CORRECTION.

Patent No. 1,845,675.                                                February 16, 1932.

OTTO V. MARTIN.

It is hereby certified that error the above numbered patent was erroneously issued to "The Texas Company, of New York, N. Y., a corporation of Delaware" as assignee of the entire interest in said invention, whereas said patent should have been issued to the inventor said Otto V. Martin and The Texas Company, of New York, N. Y., a corporation of Delaware, as assignee of one-half interest only, as shown by the records of assignments in this office; and that the said Letters Patent should be read with this correction therein that the same may conform to the record of the case in the Patent Office.

Signed and sealed this 24th day of July, A. D. 1934.

Bryan M. Battey (Seal)                                                Acting Commissioner of Patents.